United States Patent [19]

Matsumoto et al.

[11] 4,256,478
[45] Mar. 17, 1981

[54] METHOD FOR FORMING STABLE HIGH-VELOCITY GAS STREAM

[75] Inventors: Jun Matsumoto, Itami; Akira Tanigaki, Tsu; Nobuyoshi Ohsato, Itami; Nobuhiko Tokuda, Kawanishi; Keihachiro Tanaka, Itami, all of Japan

[73] Assignee: Nippon Sheet Glass Co., Ltd., Japan

[21] Appl. No.: 35,501

[22] Filed: May 2, 1979

[30] Foreign Application Priority Data

May 8, 1978 [JP] Japan .................................. 53/54802

[51] Int. Cl.$^3$ ............................................. C03B 37/00
[52] U.S. Cl. ............................................. 65/5; 65/32; 65/374 M
[58] Field of Search .................. 65/2, 5, 16, 32, 374 M

[56] References Cited

U.S. PATENT DOCUMENTS

| | | | |
|---|---|---|---|
| 3,210,167 | 10/1965 | Lacroix et al. | 65/374 M X |
| 3,647,382 | 3/1972 | Tilbrook | 65/12 |
| 3,656,924 | 4/1972 | Chapman et al. | 65/32 |
| 3,829,301 | 8/1974 | Russell | 65/12 X |
| 3,883,340 | 5/1975 | French et al. | 65/32 X |
| 4,135,903 | 1/1979 | Ohsato et al. | 65/5 |

OTHER PUBLICATIONS

Chaston, "Platinum Metals Review", vol. 8, (2) pp. 50-54, 1964.
Chaston, "Platinum Metals Review", vol. 10, (6) pp. 91-93, 1966.
Powell, "Platinum Metals Review", vol. 2, (3) pp. 95-98, 1958.

*Primary Examiner*—Robert L. Lindsay, Jr.
*Attorney, Agent, or Firm*—Wenderoth, Lind & Ponack

[57] ABSTRACT

A method for forming a high-velocity gas stream stably, which comprises jetting out a gas having an oxygen content of 0 to 2% by volume under pressure from a jet opening having an inside wall made of a platinum-group metal and maintained at a high temperature. This method effectively prevents the consumption of a jet opening made of a platinum-group metal.

8 Claims, No Drawings

METHOD FOR FORMING STABLE HIGH-VELOCITY GAS STREAM

This invention relates to a method for forming a high-velocity gas stream stably. More particularly, the invention pertains to a method for forming a high-velocity gas stream stably through a jet opening having an inside wall made of a platinum-group metal.

A method has previously been known to force a high-velocity jet stream of a high-temperature high-pressure gas from a jet opening surrounded by an inside wall made of a platinum-group metal such as platinum, for example from a platinum nozzle. For example, a method is known which comprises jetting out high-temperature high-pressure air or an exhaust gas discharged from a glass melting furnace and maintained at high temperature and pressure through a plurality of platinum nozzles to cause it to act as a swirling jet stream on a cylindrical stream of a melt of a heat-softenable material such as glass and thereby to attenuate the heat-softenable material into fibers (see U.S. Pat. No. 4,135,903, DT-OS No. 2,637,536, and Japanese Laid-Open Patent Publication No. 25113/77). In this method, the high-velocity jet stream directly acts on the molten material, and therefore, variations in the kinetic momentum of the high-speed jet stream and variations in the distribution of flow velocity of the jet stream directly affect the quality of the resulting fibers. To obtain good quality fibers continuously, therefore, it is necessary to stabilize the kinetic momentum of the high-velocity jet stream and the flow velocity distribution of the jet stream. In fact, however, the nozzle made of a platinum-group metal is gradually consumed by the high-velocity jet stream and increases in diameter. It is impossible therefore to stabilize the kinetic momentum of the high-speed jet stream and the flow velocity distribution of the jet stream, and consequently, fibers of good quality are difficult to produce stably and continuously over a long period of time. In the prior method cited above, the flow rate of the high-speed jet stream jetted out increases substantially proportional to an increase in the area of the nozzle opening caused by the increase of the nozzle diameter. Hence, the kinetic momentum of the jet stream gradually increases, and the flow of the jet stream varies.

It is known on the other hand that platinum metal reacts with oxygen in the air even at room temperature to form a platinum dioxide coating, and at a temperature of more than about 500° C., platinum dioxide decomposes but the coating becomes thicker; the consumption of the platinum is due to the dissipation in gaseous form of the resulting platinum dioxide; and that when the air surrounding platinum metal is flowing, the platinum dioxide coating is swept away by the air stream as soon as it is formed, and the consumption of platinum consequently increases (see Johnson Matthey & Co. Limited, "Platinum Metals Review", Vol. 8, No. 2. 1964, pages 50–54).

It is also known that the rate of formation of platinum dioxide is higher as the oxygen pressure of the atmosphere becomes higher, and when the oxygen pressure is below about 0.25 torr, direct proportionality is established between the oxygen pressure and the rate of oxide formation, and under these conditions, the resulting platinum dioxide immediately becomes a gas and moves away (Johnson Matthey & Co. Limited, "Platinum Metals Review", Vol. 10, 1966, No. 3, pages 91–93, particularly page 92, left column).

A. R. Powell, in his paper entitled "Behaviour of the Platinum Metals at High Temperatures" (Johnson Matthey & Co. Limited, "Platinum Metals Review", Vol. 2, 1958, No. 3, pages 95–98), described an experiment conducted at Johnson Matthey Research Laboratories in which troughs for glass fiber production made of platinum or 10% rhodium-platinum alloy were maintained at 1,450° C. for 7 weeks in a vertical chimney of refractory brick. According to this experiment, any vapors given off by the metal were swept away by a strong upward current of air, and the troughs lost about 4.7% of its original weight (ibid., page 97, left column, line 20 to right column, line 7).

It is also known that to use troughs made of platinum, rhodium or an alloy of these at high temperatures, they are surrounded by a mixture of steam and air having so low a partial oxygen pressure that practically no loss of metal by volatilization occurs (ibid., page 97, left column, lines 4 to 19).

Thus, the three references cited above disclose that some platinum-group metals are oxidized by oxygen in the air and consumed by the evaporation of the resulting metal oxide (for example, this phenomenon is generally known as the oxidative evaporation of platinum), and that the consumption of a trough made of a platinum-group metal can be substantially prevented by diluting the surrounding air with steam.

To the best of the present inventors' knowledge, no method has been known heretofore which can form a high-velocity gas stream having a controlled kinetic momentum and a controlled flow of gas stably through a relatively small jet opening made of a platinum-group metal while preventing the consumption of the metal by oxidation.

The work of the present inventors, as will be described in detail hereinbelow, shows that when a high-velocity gas stream is to be forced out from a small jet opening of about 0.5 to about 5 millimeters in diameter at a much higher velocity than the velocity of the stream of a gas surrounding such a trough as described above, the increase of the oxygen content of the gas stream very greatly affects the increasing of the diameter of the jet opening by the consumption of the platinum-group metal, and therefore, that to continuously form a stable high-velocity gas stream having a controlled kinetic momentum and a controlled flow of gas over long periods of time, it is necessary to use a gas having a very much reduced oxygen content.

U.S. Pat. No. 4,135,903 whose inventorship partly overlaps that of the present application discloses a method for jetting out steam at 600° C. and 15 kg/cm² from a nozzle provided in a platinum crucible (see column 23, lines 9–31). However, this U.S. Patent is quite silent on the oxygen content of the steam.

It is an object of this invention therefore to provide a method for stably forming a high-velocity gas stream.

Another object of this invention is to provide a method for stably forming a high-velocity gas stream through a jet opening having an inside wall of a platinum-group metal.

Still another object of this invention is to provide a method for stably forming a high-velocity gas stream from a gas containing no oxygen gas or containing less than 2% by volume of oxygen gas.

Yet another object of this invention is to provide a method for stably forming a high-velocity gas stream from a gas containing less than 2% by volume of oxygen gas which is produced by mixing air with a combustible gas and burning the combustible gas to consume the oxygen gas in the air.

A further object of this invention is to provide a method for stably forming over a long period of time a high-velocity gas stream having a stable flow and a constant kinetic momentum while preventing the consumption of a jet opening made of a platinum-group metal.

Other objects and advantages of this invention will become apparent from the following description.

The work of the inventors has shown that when a platinum-group metal contacts an oxygen gas or a gas having a high oxygen content which is moving at a high speed, the platinum-group metal is consumed at a surprisingly high rate even at a relatively low temperature of, say, several hundred degrees centigrade as compared with the case in which the oxygen gas or the oxygen-containing gas is stagnant or is flowing at a relatively slow speed. For example, when platinum is maintained at 1300° C. in the air, the platinum begins to be consumed at its surface at a rate of about 0.05 mg/cm$^2$.hr. In contrast, when a nozzle made of platinum and having an inside diameter of 1 mm is maintained at 1300° C. and heated air pressurized to 1 kg/cm$^2$ and 6 kg/cm$^2$ respectively is jetted out from the nozzle, the platinum in the nozzle is consumed at a rate of about 2 mg/cm$^2$.hr and 7 mg/cm$^2$.hr, respectively.

The objects and advantages of this invention are therefore achieved by a method for forming a high-velocity gas stream stably, which comprises jetting out a gas containing 0 to 2% by volume of oxygen under pressure from a jet opening having an inside wall made of a platinum-group metal.

The gas used in the method of this invention has an oxygen content of 0 to 2% by volume. In other words, the gas used in this invention does not contain oxygen gas, or contains it in an amount of not more than 2% by volume. The oxygen gas content specified should be strictly maintained in the method of this invention, but various gases can be used so long as they have the specified oxygen content.

The volume percent of oxygen gas in the gaseous mixture is determined by taking each gas in the jetted gaseous mixture as an ideal gas, calculating the volumes of the gases for those at room temperature and atmospheric pressure (expressed, for example, as 100 Nm$^3$), and calculating the percentage of the volume of the oxygen gas in the jetted gaseous mixture on the basis of the calculated volumes of these gaseous components.

Accordingly, the gas used in this invention needs not always to be gaseous at room temperature and atmospheric pressure, and may be gaseous at the jetting temperature. Thus, for example, not only those substances which are gaseous at room temperature and atmospheric pressure such as nitrogen gas, hydrogen gas and carbon dioxide gas, but also those substances which are liquid at room temperature and atmospheric pressure such as steam and certain hydrocarbons can be used. They may be used as a single pure gas, or as a mixture two or more. These gases, either alone or as a mixture, may have an oxygen gas content of up to 2% by volume.

The type of the gas to be used in the method of this invention is selected depending upon the use of the high-velocity gas stream to be formed by the method of this invention. For example, when the high-velocity gas stream formed by the present invention is caused to act on a molten material such as glass heated at a high temperature for the production of glass fibers various types of gas can be used so long as a controlled kinetic momentum of the high-velocity gas stream can be fully obtained. Since air contains oxygen gas in a much larger amount than 2% by volume, it cannot be directly used as the gas in the method of this invention. However, since the air is easily available anywhere, it can be converted to a gas capable of being used in this invention by subjecting it to a suitable treatment to reduce its oxygen content to 2% by volume or below.

Accordingly, the present invention also provides a commercially advantageous method which comprises converting the air into a gas containing 0 to 2% by volume of oxygen, and forming a high-velocity gas stream stably from the resulting gas.

The following methods are simple and recommendable for conversion of the air into a gas containing 0 to 2% by volume of oxygen gas. Instead of the air, exhaust gases from a glass-melting furnace, for example, can also be used.

(1) A method which comprises mixing the air with a combustible substance such as combustible hydrocarbons (e.g., butane), contacting the resulting gaseous mixture with an oxidation catalyst such as platinum, palladium or vanadium oxide, and burning the combustible substance in the aforesaid air to consume the oxygen gas and thus to obtain a gaseous mixture containing a low oxygen content.

(2) A method which comprises mixing the air with a gas other than oxygen, such as nitrogen gas or steam, to dilute the air and to obtain a gaseous mixture having an oxygen content of not more than 2% by volume.

The gas used in this invention preferably has an oxygen content of 0 to 1% by volume, more preferably 0 to 0.5% by volume.

The jet opening used in the method of this invention has an inside wall made of a platinum-group metal.

The platinum-group metals are platinum, rhodium, palladium, osmium, iridium and ruthenium. The platinum-group metal used in this invention denotes one of these six metals, alloys of these metals with each other, and an alloy of at least 50% by weight of at least one of the six metals with another metal.

Examples of such alloys include alloys between platinum-group metals such as a platinum-rhodium alloy (for example, with a rhodium content of 3.5 to 25% by weight), a platinum-ruthenium alloy (for example, with a ruthenium content of 5 to 10% by weight), a platinum-iridium alloy (for example, with an iridium content of 5 to 30% by weight), a platinum-palladium-ruthenium alloy (for example, with a palladium content of 10% by weight, and a ruthenium content of 6% by weight), a palladium-ruthenium alloy, and a palladium-ruthenium-rhodium alloy; and alloys of at least 50% by weight of platinum-group metals with metals other than the platinum-group, such as a platinum-tungsten alloy, a platinum-nickel alloy, a platinum-tungsten alloy, a palladium-silver alloy and a palladium-copper alloy.

Of these, platinum, platinum-rhodium alloy, platinum-nickel alloy and platinum-tungsten alloy are preferred, the last three being especially preferred. The platinum-rhodium alloy, when containing zirconium dioxide, has a higher strength and high temperature resistance, and is therefore especially preferred.

The inside wall of the jet opening means the one which makes direct contact with the high-velocity gas stream jetted out under pressure.

The shape and size of the opening portion of the gas jet opening used in the method of this invention are selected according to the use of the resulting high-velocity gas stream. Generally, a jet opening with a circular opening portion is used, and the circular opening portion generally has an inside diameter of 0.2 to 5.0 mm, especially preferably 0.3 to 2.0 mm.

According to the method of this invention, the gas having an oxygen content of 0 to 2% by volume is forced out under pressure at high speed from the jet opening having an inside wall made of the platinum-group metal.

In the method of this invention, the gas stream under pressure may be formed by pressurizing the gas by a device provided independently of the jetting device having the jet opening. Or the pressurization may be performed by means of the pressurizing portion within the jetting device having the jet opening, or a pressurizing device formed integrally with the jetting device.

The pressurizing device for the gas is well known in the art. For example, various compressors such as an air compressor, a gas compressor using a diesel engine as a power source, and a gas compressor using the pressure of steam as a power source can be conveniently used.

The pressurizing device can be incorporated into the jetting device to form an integral unit. The gas to be jetted may be pressurized by simply heating it in a passage through which the gas advances toward the jet opening. In this case, that portion of the device which heats the gas is understood as the pressurizing portion within the jetting device.

Generally, the pressure of the gas stream to be jetted out greatly affects the consumption of the platinum-group metal forming the jet opening. The higher the pressure of the gas stream to be jetted, the more closely the platinum-group metal contacts the gaseous stream, and the more the consumption of the platinum-group metal is promoted.

According to this invention, the pressure of the gas stream to be jetted out, as the sum of the static pressure and the dynamic pressure of the gas stream at the opening portion of the jet opening from which the gas stream is to be forced out, is desirably at least 0.5 $kg/cm^2$, especially at least 2 $kg/cm^2$, higher than the pressure of the atmosphere into which the gas stream is jetted. In view of the objects of the present invention, to form stably a high-velocity gas stream having a stable flow and a stable kinetic momentum over a long period of time, it is rather desirable to keep the gas to be jetted in the above-mentioned pressurized condition. According to this invention, the consumption of the platinum-group metal constituting the gas stream jet opening can be inhibited even when the gas is jetted under pressure.

In the method of this invention, the jet opening having the inside wall of platinum-group metal is maintained at a high temperature.

Generally, the consumption of the platinum-group metal tends to increase with increasing temperature of the jet opening. According to this invention, the consumption of the platinum-group metal of the jet opening can be inhibited by using the gas having an oxygen content of not more than 2% by volume, and a high-velocity gas stream having a stable flow and a stable kinetic momentum can be formed over a long period of time. It is generally desirable therefore that the gas to be jetted should be pre-heated to a temperature which is not much different from the temperature of the jet opening.

The temperature of the jet opening having the inside wall of platinum-group metal, which varies depending upon the type of the platinum-group metal, is preferably limited at the highest to a temperature considerably lower than the melting point of the platinum-group metal (e.g., a temperature about 200° C. lower than the melting point of the metal). Preferably, the lower limit to the temperature of the jet opening is adjusted to about 500° C. Especially preferably, the temperature is about 700° to about 1400° C., above all about 1000° C. to about 1350° C.

Thus, the present invention makes it possible to form stably over a long period of time a high-velocity gas stream having a temperature which ranges from about 300° C. above the temperature of the jet opening to about 900° C. below the temperature of the jet opening.

Conversion of the air into a gas having an oxygen content of 0 to 2% by volume is described in greater detail below.

(1) A method for obtaining a gaseous mixture having a low oxygen content, which comprises mixing the air with a combustible substance such as butane, contacting the resulting gaseous mixture with a catalyst such as platinum, palladium or vanadium oxide, and burning the combustible substance in the air to consume the oxygen gas.

The combustible substance is preferably a hydrocarbon which mainly forms carbon dioxide and water upon burning. It may be either gaseous, liquid or solid, but a gas is preferred. To reduce the oxygen content of the gaseous mixture obtained by this method further, it is possible to mix the gaseous mixture with a combustible substance such as butane, and repeat the above procedure.

Generally, the combustible substance tends to burn incompletely. Thus, even when the air is burned by mixing the combustible substance in an amount corresponding to the theoretical amount of oxygen for burning, the oxygen gas remains in the resulting gaseous mixture. To reduce the remaining oxygen content in the gaseous mixture after burning to a level near zero, it is necessary to effect enough burning by incorporating the combustible substance (preferably in gaseous form) in an amount more than the one corresponding to the amount of oxygen theoretically required for burning, thus effecting enough burning.

The amount of oxygen required theoretically for burning means the amount of oxygen required for the carbon moiety and the hydrogen moiety of the combustible substance to be converted to carbon dioxide and water, respectively. When it is desired to reduce the remaining oxygen gas content in the gas after burning to nearly zero, the amount of the combustible substance should desirably be adjusted to the one about 1% in excess of the amount of oxygen theoretically required for burning.

When too much combustible substance is mixed in a combustion furnace made of refractories, the platinum-group metal forming the gas jet opening becomes brittle. Inclusion of too large an amount of the combustible substance is undesirable.

Incompletely burned gaseous mixtures can also be used as the gas to be jetted by the method of this invention if they have an oxygen content of not more than 2% by volume. Even when the gaseous mixture contains carbon monoxide, aldehydes or the unburned combustible substance, these reducing ingredients do not cause the consumption of the platinum-group metal. The gaseous mixture obtained by burning the combustible substance may contain sulfur oxides and nitrogen oxides attributed to the air or combustible substance used or vanadium oxide, etc. attributed to the catalyst. However, these compounds neither cause the consumption of the platinum-group metal.

The resulting gaseous mixture may be further mixed, as required, with carbon dioxide gas, steam, nitrogen gas, sulfur dioxide, etc. for use as the gas to be jetted out by the method of this invention. Inclusion of carbon dioxide gas having a high specific gravity is expected to increase the kinetic momentum of the resulting high-velocity gas stream. Steam is preferably used to reduce the temperature of the gaseous mixture obtained as a result of burning. When the resulting high-velocity gas stream is to be used for the production of glass fibers, the addition of sulfur dioxide is expected to reduce the surface tension of glass and the undesirable formation of glass beads.

The resulting gaseous mixture having an oxygen content of not more than 2% by volume can be used at the temperature and pressure which it has immediately after preparation. If required, it may be further heated or pressurized before use.

Generally, a gaseous mixture as obtained by the combustion of combustible substance as described hereinabove attains a temperature exceeding 1,000° C. if its residual oxygen content is adjusted to not more than 2% by volume. Desirably, in view of restrictions on a material for a piping system, the temperature of the gas is reduced to not more than 800° C., for example to 300° to 500° C. The decrease of the temperature is preferably effected by forcing steam at 100° C. to 250° C. into the gas.

To prevent overheating, it is especially preferable to burn the combustible substance in two steps as described above. For example, air having the bombustible substance mixed therewith is burned, and after mixing the resulting gas with the combustible substance and steam, the mixture is again burned. For industrial operation, it is especially desirable to employ a method which comprises performing the first-step burning by using the combustible substance in an amount sufficient to permit the consumption of a part, preferably about 10 to 40%, of oxygen gas present in the air, then adding steam to the resulting gaseous mixture to decrease the temperature of the gas, and adding the combustible substance in an amount required for the consumption of the remaining oxygen gas to perform the second-step burning to obtain a gaseous mixture containing 0 to 2% by volume of oxygen gas. According to this method, overheating (e.g., to more than 1,000° C.) of the gaseous mixture obtained by burning can be avoided. Accordingly, the consumption of the furnace material of the burning chamber can be reduced, and the gaseous mixture having an oxygen content of 0 to 2% by volume can be advantageously obtained.

When it is desired to pressurize the resulting gaseous mixture having a reduced oxygen content, it is desirable, in view of restrictions on the operation of a compressor to be used, to cool the gaseous mixture to not more than 100° C., for example. When a compressor utilizing steam as a power source is used at this time, the oxygen content of the gaseous mixture can be further decreased by mixing the gaseous mixture with the waste steam resulting from the pressure reduction of the high-pressure steam used as the power source.

An air compressor and gas compressors utilizing a diesel engine as a power source can also be used. When the gas compressor utilizing a diesel engine is used, the waste gas from the compressor which has a reduced oxygen content can be used instead of the air in the above-described method.

(2) A method for obtaining a gaseous mixture having an oxygen content of not more than 2% by volume by mixing the air with a gas other than oxygen gas, such as nitrogen gas or steam.

This method requires a large quantity of the other gas to be mixed with the air in order to reduce the oxygen content of the air to 2% by volume or less. Furthermore, with this method, it is theoretically impossible to obtain a gas having an oxygen content of zero. Thus, for practical application, this method is less significant than the method (1).

Accordingly, the method (1) is preferred in the present invention when it is desired to convert the air into a gaseous mixture having an oxygen content of not more than 2% by volume. It is desirable to use the method (2) for the purpose of further reducing the oxygen content of the gaseous mixture having its oxygen content reduced by the method (1).

Thus, according to the method of this invention, a high-velocity gas stream having a stabilized flow and a stabilized kinetic momentum can be formed stably from a gas jet opening made of a platinum-group metal and held at a high temperature. The resulting high-velocity gas stream can be used, for example, to produce glass fibers of a definite quality from molten glass over a long period of time by utilizing its stabilized flow and kinetic momentum.

According to this invention, when from a tubular nozzle having an opening portion with an inside diameter of 0.3 to 2.5 mm made of a platinum-group metal, a pressurized gas having a pressure at least 0.5 kg/cm$^2$ higher than the pressure of the atmosphere at the opening portion of the nozzle was continuously jetted for 3 months, the consumption of the platinum-group metal at the opening portion was slight, and a stable high-velocity gas stream having a substantially constant flow and a substantially constant kinetic momentum could be continuously formed.

The velocity of the high-velocity gas stream at the opening portion of the gas jet opening is preferably 50 to 2,000 m/sec, especially 100 to 1,500 m/sec, above all 200 to 1,000 m/sec.

EXAMPLE 1

(1) A manifold was made by providing 50 nozzle holes having an inside diameter of 1.2 mm at intervals of about 5 mm on the side wall of a thick tube of platinum-rhodium alloy (90% of platinum and 10% of rhodium) having an inside diameter of 2.5 mm, a wall thickness of 4 mm and a length of 300 mm.

The manifold was heated to 1,350° C. A gas (oxygen gas content 0.16% by volume) consisting of 28.58 Nm$^3$/hr of nitrogen, 4.46 Nm$^3$/hr of carbon dioxide, 0.166 Nm$^3$/N of oxygen, 69.66 Nm$^3$/hr of steam and 0.026 Nm$^3$/hr of unburned gas and having a temperature of 850° C. was continuously jetted out through the 50 nozzle holes of the manifold at a pressure of 5.0 kg/cm$^2$ and a flow rate of about 300 m/sec for 100 days. During the 100 day period, the kinetic momemtum of the high-velocity gas stream jetted out through each nozzle was checked, but no variation was observed.

At the end of the 100 day period, the jetting of the gas was stopped, and the diameter of each nozzle hole was measured. None of the 50 nozzle holes showed an increase in diameter.

During the jetting out of the high-velocity gas stream, the sum of the dynamic and static pressures of the gas under a pressure of 5.0 kg/cm$^2$ introduced into the manifold was always 5.0 kg/cm$^2$, and no pressure drop could be determined within the manifold and the nozzle holes.

(2) For comparison, a manifold having the same specification as above was used, and heated to the same temperature as in (1) above. Air having an oxygen content of 20.6% by volume and heated at 850° C. was jetted out from the nozzle holes continuously for 7 days at the same pressure and rate as in (1) above.

After the seven day period, the kinetic momentum of the jetted gas stream increased by about 100% on an average from the initial kinetic momentum of the jetted gas stream at the start.

The diameters of the fifty nozzle holes were initially 1.2 mm, but after the seven day period, increased to 1.7 mm on an average. The inside wall of the platinum-rhodium alloy was consumed at a rate of 650 mg/cm$^2$ on an average.

(3) The gas having an oxygen content of 0.16% by volume used in (1) was prepared in the following manner.

Air under a pressure of 8 kg/cm$^2$ and butane gas under a pressure of 9 kg/cm$^2$ were introduced into a burning furnace containing platinum as an oxidation catalyst at a rate of 36 Nm$^3$/hr and 0.29 Nm$^3$/hr, respectively, and mixed and burned to give a gas having an oxygen content of 15.1% by volume and a temperature of 500° C. The resulting gas was introduced into a burning furnace containing platinum as an oxidation catalyst, and mixed with 51.50 kg/hr of steam at a pressure of 5 kg/cm$^2$ and a temperature of 150° C. and 0.85 Nm$^3$/hr of butane gas at a pressure of 9 kg/cm$^2$ to form the gas having the composition shown in (1) above (oxygen content 0.16% by volume, pressure 5.0 kg/cm$^2$, temperature 850° C.).

EXAMPLE 2

Steam having a temperature of 150° C. and a pressure of 5 Kg/cm$^2$ and air having a pressure of 5 kg/cm$^2$ and room temperature were mixed in varying proportions. The gaseous mixtures were each pressurized and heated to form eight high-temperature high-pressure gases having a pressure of 6 kg/cm$^2$, a temperature of 800° C., and the oxygen contents shown in Table 1.

Eight manifolds of the same specification as in Example 1 were provided, and heated to 1,350° C. The eight gases were introduced in these manifolds, and continuously jetted out at a flow velocity of 400 m/sec for seven days. The nozzle diameters were initially 1.20 mm. After the seven day period, the nozzle diameters were measured, and the results are shown in Table 1.

TABLE 1

| Oxygen content (% by volume) of the gas | Inside diameter of the nozzle measured seven days after the starting of jetting (mm) | Increase of the inside diameter of the nozzle seven days after the starting of jetting over the initial diameter (%) |
|---|---|---|
| 20.6 | 1.70 | 41.7 |
| 10.0 | 1.45 | 20.8 |
| 5.0 | 1.32 | 10.0 |
| 2.0 | 1.25 | 4.2 |
| 1.0 | 1.22 | 1.7 |
| 0.5 | 1.21 | 0.8 |
| 0.2 | 1.20 | 0.0 |
| 0.0 | 1.20 | 0.0 |

It is seen from the results shown in Table 1 that the enlarging of the jet opening can be markedly inhibited when the oxygen content of the high-temperature high-pressure gas stream is not more than 2% by volume, especially not more than 1% by volume, above all not more than 0.5% by volume.

EXAMPLE 3

Using an apparatus of the type shown in FIGS. 31-a and 31-b of U.S. Pat. No. 4,135,903 to Ohsato et al., molten glass was fiberized by jetting out the gas prepared in Example 1, (3) at a flow velocity of about 300 m/sec. instead of using air stream.

A melt-flowing nozzle having an effective hole diameter of 2 mm was used, and the rate of extrusion of the molten glass was set at 1 kg/hour. The fiberization was performed continuously for 30 days. During this time, the proportion (%) of unfiberized mass was checked every day at a fixed time. At the initial stage of fiberization, the proportion of unfiberized mass was about 8.5%, and at the end of the thirty day period, it was about 8.8%. During this time, the proportion scarcely varied and was stable.

The inside diameter of the gas jet opening was examined at the end of the thirty day period, but no change was observed.

What we claim is:

1. In a method for making glass fibers which comprises jetting a high-velocity gas stream of molten glass from a jet opening having an inside wall made of a platinum group metal, said wall being maintained at high temperature and fiberizing said molten glass, the improvement wherein said high-velocity gas stream has an oxygen content of 0 to 2% by volume, a stable flow and a constant kinetic momentum and said gas stream is jetted out from said jet opening at a velocity of 50 m/sec. to 2000 m/sec. at the opening portion of said jet opening at a pressure at least 0.5 kg/cm$^2$ higher than the pressure of an atmosphere into which it is jetted, whereby consumption of said platinum inside wall is reduced.

2. The method of claim 1 wherein the gas has an oxygen content of 0 to 1% by volume.

3. The method of claim 2 wherein the gas has an oxygen content of 0 to 0.5% by volume.

4. The method of claim 1 wherein said gas is prepared by burning a combustible substance in the air and diluting the resulting gas with steam.

5. The method of claim 1 wherein the jetting pressure is at least 2 kg/cm$^2$ higher than the pressure of the atmosphere.

6. The method of claim 1 wherein the temperature of the inside wall of the jet opening ranges from about 500° C. to a temperature about 200° C. below the melting point of the platinum-group metal.

7. The method of claim 1 wherein the opening portion of the jet opening has an area corresponding to that of a circular opening having an inside diameter of 0.5 to 5.0 mm.

8. The method of claim 4 wherein said gas having an oxygen content of 0 to 2% by volume is a gaseous mixture obtained by burning a combustible substance in the air to cause consumption of a part of the oxygen gas in the air, then diluting the resulting gaseous mixture with steam, adding a further combustible substance, and again burning the combustible substance in the gaseous mixture.

* * * * *